UNITED STATES PATENT OFFICE 2,555,179

PRODUCTION OF FORM-STABLE, RUBBER-LIKE POLYVINYL ISOPROPYL ETHERS

Abraham O. Zoss, Easton, Pa., assignor to General Aniline & Film Corporation, New York, N. Y., a corporation of Delaware No Drawing. Application April 11, 1945, Serial No. 587,839

2 Claims. (Cl. 260—91.1)

The present invention relates to the preparation of rubberlike, form-stable, high molecular weight polymers of vinyl isopropyl ether.

Considerable work has been done in connection with the polymerization of vinyl ethers and much of this work is reported in prior patents and publications. In this connection, reference may be made to Chalmers, Canadian Journal of Research, volume 7, pages 472–480 (1932), U. S. P. 2,104,000 and its French counterpart 734,129, U. S. P. 2,104,001, 2,104,002, 2,061,934, 2,098,108 and 2,188,778.

It is always one of the major aims of workers in the polymerization field to produce high molecular products which are form-stable. By form-stable I mean products which under ordinary conditions retain their shape on standing and do not flow to take the form of the vessel in which they may be confined. The reason for the desire to obtain the form-stable polymers is due to the fact that such polymers may be put to applications for which the non-form-stable products are unsuitable. They may, for example, be used in the molding, pressure-casting and extrusion art. They may be rolled out into thin sheets for use in lamination work or for use as wrapper films, container coatings and the like. They may also be used as electrical and heat insulators depending upon the electrical characteristics and softening point thereof. They may also be employed in many cases as rubber substitutes. Operators in the polymerization field therefore do not consider that the polymerization of a class of monomers has been sufficiently developed unless methods have been devised by which the monomers may be polymerized to the normally solid or form-stable products.

Practically all of the work which has been done in connection with the polymerization of vinyl ethers excepting the vinyl isobutyl ethers has led to the formation of viscous, sticky, honey-like masses. It appears to have been the impression of the prior workers in this field that the vinyl ethers could not only be effectively polymerized by causing the reaction to take place at such a violent rate that the reaction is completed immediately after contact with the monomer of the usually employed acid reacting catalyst. As a consequence, the prior art when polymerizing monomers other than the vinyl isobutyl ether utilize temperatures ranging upwards from about −10° C. and preferably within the range of 40 to 60° C., thereby obtaining only viscous, liquid to soft solid products. For instance, U. S. P. 2,104,000 states that the temperatures to be employed for the polymerization of vinyl ethers should be generally from 10 to 120° C. and preferably between 20 and 100° C. It points out that where polymerization is effected by the utilization of a boron halide addition product, a temperature of between 40 and 60° C. is to be recommended. One need only refer to the examples of this patent—for instance, to Example 1, to observe that by operating in the manner proposed, the products which are obtained are not form-stable but, on the contrary, are viscous liquid products.

The inability of the art to realize the form-stable polymers is especially aggravated in the case of the vinyl isopropyl ether monomer. From the standpoint of polymerization, this monomer is one of the most reactive of all the vinyl ether monomers. Under the usual conditions of polymerization, it polymerizes with explosive violence, yielding only the sticky, viscous products of the prior art. This is true even when working at reduced temperatures, i. e., below −10° C. since a reduction of temperature alone fails to abate the explosive nature of the reaction.

I have now found that it is possible to control the reaction and enable the formation of the form-stable rubberlike polyvinyl isopropyl ethers by a careful correlation of the temperature of the reaction with the catalyst and the concentration in which the catalyst is employed. By such correlation of the temperature and catalyst concentration, it is possible to moderate the reaction to such an extent as to produce the desired form-stable products.

It is accordingly an object of this invention to produce form-stable, rubberlike polymers of vinyl isopropyl ether.

A further object of the invention is such polymers.

Another object of the invention is a process of producing form-stable, rubberlike polymers and copolymers of vinyl isopropyl ether by a controlled method which causes the polymerization to take place at a moderate rate.

A further object of the invention involves the polymerization of vinyl isopropyl ether while moderating the reaction by regulating the temperature and diluting the catalyst.

A further object of the invention is polymers of vinyl isopropyl ether which are of high molecular weight, rubberlike, spongy, tenacious, elastic, form-stable solids.

A further object of the invention is high molecular weight rubberlike polyvinyl isopropyl ethers which may be utilized as rubber substitutes, in extruding and molding operations, as electrical and heat insulators, and the like.

It is a further object of this invention to produce products which are superior from the standpoint of homogeneity by uniformly premixing the monomer, diluent and the catalyst at a temperature below that at which polymerization ensues and effecting polymerization by subsequently elevating the temperature of the uniform mixture.

It is a further object to insure better heat control and rate of reaction by polymerizing a uniformly premixed composition of the monomer, diluent and catalyst.

Other and further important objects of the invention will be apparent as the description proceeds.

The polymerization of the vinyl isopropyl ether monomer is effected by the utilization of an acid-reacting catalyst such as tin tetrachloride, stannous chloride, aluminum chloride, iron chloride, zinc chloride, sulfuric acid, hydrochloric acid, sulfur dioxide, and the like. However, the process is better controlled and superior products are obtained when utilizing the catalysts in the form of their addition products with ethers (see Gmelin's Handbuch Der Anorganischen Chemie, 8th edition, volume Boron, pages 114 et seq.). Examples of ethers which I have found suitable for use in this relationship are diethyl ether, dipropyl ether, ethyl methyl ether, dibutyl ether, diamyl ether and the like. The catalysts are used in relatively small quantities, for instance, in the proportions referred to in the aforementioned U. S. P. 2,104,000.

The feature upon which the present invention is predicated resides in the discovery that the mild reaction so essential to the formation of the form-stable rubberlike polymers can only be obtained by a careful correlation of the reaction temperature with the catalyst and its concentration at the time of contact with the monomer. The temperature which I have found must be employed during the entire time of contact between the catalyst and monomer, ranges from —10° C. to —100° C. and preferably —40 to —80° C. While the temperature may vary within the stated range, depending upon the particular catalyst selected and the extent to which the same is diluted, nevertheless, irrespective of the latter factors, the desired products cannot be obtained if the temperature is allowed to rise above the upper limit given. Thus it has been ascertained that even when using the best catalyst for the reaction, to wit, an acid catalyst-ether complex, particularly the boron fluoride-diethyl ether complex, and slowly adding the same while diluted in the ratio of 1 part of the catalyst to 1 part of the ether used in forming the complex, to the monomer at a temperature of 0° C., the reaction takes place at an extremely rapid rate with the formation of the aforementioned viscous, sticky polymers.

On the other hand, the mere maintenance of the reaction temperature within the stated limits will not suffice to give the desired end products. Even if the temperature be maintained as low as, say —78° C., and the preferred catalyst be slowly added in an undiluted condition to the monomer, the violent reaction noticed by the prior art cannot be avoided. It is therefore just as essential to dilute the catalyst as it is to maintain the reaction temperature within the stated limits.

If the catalyst employed be normally solid, the desired dilution can be effected by dissolving the same in a solvent therefor. Similarly, if the catalyst be normally liquid, the dilution may be effected by the utilization of a diluent miscible with the catalyst. On the other hand, if the catalyst be employed in the gaseous state, a condition which will obtain when utilizing, for instance, boron trifluoride, the dilution of the catalyst is attained by mixing with nitrogen or by adding additional solvent or diluent to the vinyl ether. The solvent or diluent may be an aliphatic hydrocarbon of the type subsequently referred to or preferably when utilizing the complex catalysts, the ether with which the complex is formed. Suitable dilution of the catalyst may be attained by the employment of 1 part of the catalyst to ¼ to 4 parts of the diluent.

Various methods may be resorted to in attaining and maintaining the necessary reaction temperature. Solid carbon dioxide, for instance, may be effectively employed. Similarly, the desired lower temperature may be secured by the use of liquefied hydrocarbons such as liquefied propane, liquefied ethylene and the like, or by the use of liquid alkyl chlorides such as methyl chloride and the like. These diluents may be used to cause refrigeration either by circulation of the same or by vaporization of the diluent from the reaction mixture.

The reaction may be carried out by adding the catalyst cooled to the desired reaction temperature to the monomer or its solution, both similarly cooled, or by adding the monomer cooled to the reaction temperature to the similarly cooled catalyst mixture. While cooling the catalyst facilitates the reaction, the temperature thereof should not be lowered to the reaction temperature should the catalyst solidify at this point. If the catalyst does solidify at the desired reaction temperature, then the cooling thereof should be carried to the lowest point only where the catalyst still remains in a non-solidified state. It can be readily ascertained either from the critical tables or by simple experiments, the extent to which the catalyst may be cooled without solidification thereof taking place.

While I have obtained good results by operating in the manner stated, I have found that the reaction is better expedited from the standpoint of heat control and speed of the reaction and that products of a superior homogeneity are obtained if the catalyst and monomer be uniformly mixed at a temperature at which polymerization does not ensue and polymerization be effected after mixing by subjecting the mixture to a higher temperature and within the aforestated limits. It is known that catalytic reactions are best effected where steps are taken to insure the greatest possible amount of contact between the catalyst and the substances which are being subjected to the reaction. By uniformly premixing the catalyst and the monomer, such contact is produced. Furthermore, the uniform mixing of the catalyst and monomer at a temperature below which polymerization is avoided overcomes any problems of local overheating which might arise by adding the catalyst to the monomer or the monomer to the catalyst at the reaction temperature.

The art has always been under the impression that vinyl compounds which polymerize at low temperatures, i. e., below 0° C. undergo polymerization in the presence of an acid catalyst irrespective of the temperature applied. For instance, it has been reported that when polymerizing isobutylene, the rate of reaction is not decreased by lowering the temperature. Contrary to the expectations and belief of the art in this respect, I have found that for each vinyl ether the rate of reaction varies with the temperature and that there is for each a temperature at which the rate of polymerization is substantially zero when the polymerization is effected in the presence of a diluted acid reacting catalyst. For the vinyl isopropyl ether monomer, such temperature is below —110° C., a temperature which can be obtained by employing liquid nitrogen, liquid methane or the like as the cooling medium.

If the reaction be carried out by adding the monomer to the catalyst or the catalyst to the monomer at the reaction temperature, it is necessary that the reaction heat should be dissipated and localized overheating be avoided in order to insure that the reaction takes place within the stated limits. The dissipation of the reaction heat may be procured by using solvents or diluents which are liquid at the reaction temperature, and for this purpose resort may be had to the liquefied hydrocarbons and chlorinated hydrocarbons previously mentioned. Localized overheating is avoided by the gradual and portionwise addition of one reactant to the other. Without taking care to see that the addition of the reactants is gradual, certain areas in the reaction mass become overheated and the resulting polymerization in such areas inevitably produces the undesirable low molecular weight viscous products.

When the reaction is complete, the catalyst is deactivated, a procedure which will hereinafter be referred to as "quenching," by a treatment which is preferably carried out at very low temperatures specifically within the limits at which the reaction has been effected. For effecting the quenching, use may be made of an alkali, such as ammonium hydroxide, sodium hydroxide, potassium hydroxide, an organic amine such as methyl amine, dimethyl amine, ethanolamine, diethanolamine, pyridine and the like, an alcohol such as methanol, ethanol, butanol, benzyl alcohol and the like, a carbonyl compound such as acetone, methyl ethyl ketone, formaldehyde, acetaldehyde and the like. Should it transpire that any of these quenching agents freezes at the quenching temperature, solidification of the same is avoided by employing with the quenching agent a small amount of an inert diluent such as pentane.

The inactivated catalyst and quenching agent may be removed by washing the solution of the polymer in its reaction solvent or in another solvent such as benzene at room temperature (about 20° C.) with water or with water rendered alkaline by the addition of a small amount of an alkali such as ammonia, sodium hydroxide, potassium hydroxide and the like. On the other hand, such agents may be removed by dissolving the dry polymer in a solvent therefor and precipitating the polymer from its solution with the aid of a substance in which the polymer is insoluble, such as ethanol, methanol and the like. By causing the quenching to take place at the stated low temperatures, it is insured there will be no conversion of any residual monomer at a temperature at which the undesirable low molecular weight products are formed.

While it is possible to produce the form-stable, rubberlike polymers by carrying out the reaction in a reactor open to the air, better results are obtained when air is essentially excluded. The polymerization, moreover, may take place conveniently at atmospheric pressure, reduced pressure of the order of 200 millimeters or the like, or slightly elevated pressure such as 2½ atmospheres.

The vinyl isopropyl ether polymer may be copolymerized with other vinyl monomers, such as other vinyl ethers under the stated conditions to give the form-stable, rubberlike products. Thus vinyl n-butyl ether when copolymerized with vinyl isopropyl ether yields a product similar to but more tacky than that obtained when polymerizing the vinyl isopropyl ether alone. Similarly a rubberlike product is obtained by copolymerizing vinyl isopropyl ether with other polymerizable ethers such as vinyl isobutyl ether or with other polymerizable monomers such as isobutylene.

The polyvinyl isopropyl ethers and their copolymers obtained by observing the conditions pointed out, are spongy, elastic, tenacious solids, form-stable on storage, in contrast to previously prepared polyvinyl isopropyl ethers. They show substantially reversible extensibility similar to partially vulcanized rubber. They are thermoplastic materials soluble in aromatic hydrocarbons such as benzene and toluene, in ethers such as diethyl ether and the like, ketones such as methyl isobutyl ketone and the like, and chlorinated hydrocarbons such as methylene chloride, carbon tetrachloride and the like. They are insoluble in water and the lower molecular weight alcohols such as methanol, but are soluble in normally liquid higher molecular weight alcohols such as butanol, amyl alcohol, hexyl alcohol and the like.

It may be stated as a general rule that the lower the reaction temperature the higher the molecular weight of the product. Depending upon the molecular weights of the products, they may range from tacky, form-stable, to essentially non-tacky, form-stable polymers. Because of the peculiar characteristics of the products, they may be put to use in many different fields. For instance, they may be worked on a rubber mill for compounding purposes or cast from a solution thereof for laminating and coating purposes, and for the production of transparent sheets and foils. They may be extruded, pressure cast or molded. They may be used as adhesives, electrical insulators, heat insulators, paint binders, wrapping films, container coatings, and the like. Because of the many fields to which they are applicable, these new products fill a substantial void in the polymer art.

The invention will be further illustrated by the following examples, although it is to be understood that my invention is not limited thereto. The parts are by weight unless otherwise specified.

Example I 750 parts by weight of liquefied propane and 150 parts by weight of vinyl isopropyl ether are added to 1100 parts by weight of powdered solid carbon dioxide confined in an air-tight apparatus.

This mixture is stirred for about ½ hour to replace all the air by carbon dioxide. A cooling bath of solid carbon dioxide in ethanol is used to surround the reactor for the purpose of maintaining the desired reaction temperature, which is —78° C. Diethyl ether-boron fluoride boiling at 56° C. at 25 millimeters pressure and diluted with diethyl ether in the ratio of 2 parts of the catalyst to 1 part of the ether, is added dropwise at such a rate that the aforesaid temperature of —78° C. is not exceeded.

The catalyst is added until no monomer remains. This point may be determined by removing a liquid sample from the apparatus, allowing it to warm to evaporate the volatile solvent and adding a small amount of the catalyst to the sample. If no polymerization ensues as shown by heat evolution and charring under these drastic conditions, it is concluded that the monomer has been completely polymerized.

Concentrated aqueous ammonia cooled to the reaction temperature is then added as a quenching agent. On warming to room temperature and drying, a tough, spongy, rubberlike product is obtained which consists of uniform granules which are non-sticky and form-stable.

The intrinsic viscosity of the material is 20 (0.2 per cent in benzene).

*Example II*

The procedure is the same as in Example I, except that the precipitated polymer is removed as formed, by periodic interruption of the catalyst addition and by dipping out the solid polymer. The cold polymer is washed with precooled ammonium hydroxide before warming and drying.

*Example III*

The procedure is the same as in Example I excepting that the catalyst is precooled before addition to the monomer by passing the catalyst through a jacketed chamber cooled by a mixture of an alcohol and solid carbon dioxide.

*Example IV*

25 parts of powdered solid carbon dioxide, 50 parts of liquefied propane, and 10 parts of vinyl isopropyl ether are added to an open flask. A stream of gas containing 50 percent boron trifluoride in nitrogen is slowly passed into the reaction mixture while stirring the same. The temperature, which is originally −78° C., rises to −70° C. A solid, rubberlike material is precipitated. The catalyst is quenched with aqueous ammonia and the product is freed of volatile material washed with methanol and dried.

*Example V*

250 parts of liquefied butane and 50 parts of vinyl isopropyl ether are added to an open flask. This mixture is cooled to −78° C. by adding solid carbon dioxide to the mixture and by locating the flask in an external cooling bath of the same refrigerant. Precooled diethyl ether-boron fluoride which is diluted with diethyl ether in the ratio of 3 parts of the boron fluoride addition product to 1 part of the diethyl ether, is added portionwise to the reaction mixture at such a rate that the temperature is maintained between −78° C. and −72° C. At the completion of the reaction, quenching is effected with concentrated aqueous ammonia and the mixture is thereupon warmed to room temperature. On drying, a rubbery, form-stable, slightly tacky solid is obtained.

*Example VI*

A diethyl ether-boron fluoride solution containing 20 per cent diethyl ether is added dropwise to a mixture of 50 parts of vinyl isopropyl ether, 400 parts of liquefied propane, and 500 parts of powdered solid carbon dioxide. The reaction temperature is maintained at −78° to −75° C. by means of an outside cooling bath of solid carbon dioxide in ethanol. On quenching, the reaction mixture with aqueous ammonia and drying, a slightly tacky, rubber-like solid is obtained. The polymer is dissolved in benzene and precipitated with methanol to produce a product free of catalyst residue and of quenching agent. Upon washing with fresh methanol and drying, a form-stable, spongy polymer is recovered.

*Example VII*

200 parts of vinyl isopropyl ether are added to 370 parts of solid carbon dioxide. A precooled 25 per cent solution (by volume) of diethyl ether-boron fluoride in diethyl ether is added dropwise to the reaction mixture while stirring. The reaction temperature is −78 to −77° C. After completion of the reaction, unchanged monomer is separated from the polymer and recovered. The rubber-like polymer is quenched with aqueous ammonia and dried. It is dissolved in benzene and this solution is washed several times with water to remove the catalyst residue and quenching agent. The polymer is recovered by evaporation of the benzene, which may be reused in the process.

*Example VIII*

100 parts of vinyl isopropyl ether precooled to −78° C. are added dropwise with stirring to a mixture of 800 parts of liquefied propane and 3 milliliters of diethyl ether-boron fluoride maintained at the same temperature. After the polymerization is complete, the reaction mixture is quenched with 10 mls. of precooled 28% ammonium hydroxide and the resulting mixture warmed to room temperature. A rubberlike, form-stable product is thus obtained.

*Example IX*

800 mls. of gaseous boron trifluoride are passed into 750 parts of liquefied propane cooled externally by solid carbon dioxide to −75° C.

100 parts of vinyl isopropyl ether precooled to −75° C. are slowly added portionwise to the mixture. After reaction has been completed, the mixture is quenched, whereupon there is obtained a spongy, elastic, form-stable polymer.

*Example X*

A solution of 50 parts of vinyl isopropyl ether and 250 parts of methylene chloride is cooled to −78° C. with solid carbon dioxide. Precooled diethyl ether-boron fluoride diluted with diethyl ether in the ratio of 2 parts of the boron fluoride complex to 1 part of the diethyl ether is added dropwise with stirring to effect the polymerization. The catalyst is inactivated with ammonium hydroxide. After warming to room temperature, methanol is added to precipitate the polymer from its methylene chloride solution and upon drying there is obtained a tenacious, rubbery, form-stable product.

*Example XI*

Diethyl ether-boron fluoride diluted in the ratio of 3 to 1 with ethyl ether is added dropwise to a solution of 50 parts of vinyl isopropyl ether and 50 parts of vinyl n-butyl ether in 500 parts of liquefied propane cooled to −78° C. The copolymer formed is treated with concentrated aqueous ammonia at the temperature of the reaction. On drying, a rubberlike copolymer which is form-stable is obtained.

*Example XII*

50 parts of vinyl isopropyl ether and 200 parts of liquefied ethylene are added to a reaction vessel located in a cooling bath effective to maintain a reaction temperature of −100° C. Diluted ethyl ether-boron fluoride is added dropwise to the mixture while stirring to cause polymerization to ensue. A precooled aqueous ammonia-methanol solution is employed to quench the reaction mixture. The mixture is then warmed to room temperature and the polymer dried. An elastic, form-stable product is thereby obtained.

*Example XIII*

Dibutyl ether-boron fluoride boiling at 61.9° C. at 10 mm. and diluted in the ratio of 2 parts to 1 with diethyl ether is added dropwise to a solution of 50 parts of vinyl isopropyl ether and 250 parts of liquefied propane maintained at a reaction temperature of −45° C. with a cooling bath of solid carbon dioxide.

After the polymerization is complete, a solution of sodium hydroxide in methanol is added as a quenching agent and the mixture is warmed to room temperature. There is thus obtained a form-stable granular polymer having an intrinsic viscosity of 5 (1 per cent in benzene).

*Example XIV*

The polymerization is carried out as in Example I except that in place of solid carbon dioxide, a coil is fitted into the polymerization apparatus through which liquefied ethylene is circulated for the purpose of maintaining the reaction temperature desired and for effectively removing the heat of polymerization.

*Example XV*

The process is the same as in Example I except that instead of using solid carbon dioxide as the refrigerant, the heat of vaporization of the solvent is utilized for this purpose. A vacuum of 200 mm. is applied to the reaction mixture containing liquid propane as the solvent to maintain a temperature of −75° C. The propane which is recovered is condensed and recycled to the reaction.

*Example XVI*

800 parts of liquefied propane are cooled by means of a liquid nitrogen bath to a temperature of −110° C. and 100 parts of vinyl isopropyl ether are added to the liquefied propane. 3 mls. of a solution of 1 part of diethyl ether-boron fluoride in 3 parts of diethyl ether are then added. At the prevailing temperature no appreciable polymerization of the vinyl ether takes place.

The reaction mixture is then allowed to warm to a temperature of −78° C., with vigorous agitation to cause polymerization to ensue. After the completion of the reaction, 10 mls. of precooled 28% ammonium hydroxide are added as a quenching agent and the mixture warmed to room temperature. A very homogeneous, rubberlike, form-stable product is thus obtained.

*Example XVII*

The procedure is the same as in Example I except that there is used the diethyl ether-aluminum chloride complex in lieu of the diethyl ether-boron fluoride complex of Example I.

Reference has previously been made to the fact that vinyl isobutyl ether has been polymerized at low temperature to a rubberlike solid, such polymerization being described in U. S. P. 2,061,93. The procedure in this patent, however, should not be confused or be considered analogous to the procedure described herein. Apparently the vinyl isobutyl ether has properties which distinguish it from the other monomers in this field. According to the patent, for example, it is stated that at the temperatures given therein, immediate polymerization ensues when the monomer is contacted with the catalyst. For instance, in Example I the polymerization, it is stated, "commences immediately and turbulently and is practically complete after a few seconds." The vinyl isopropyl ether, on the other hand, when operating in the manner recited, polymerizes uniformly and slowly. Such uniform and slow polymerization, moreover, is absolutely essential to the obtaining of the uniform, rubberlike, form-stable vinyl isopropyl ether polymers. As previously emphasized, if the polymerization of the vinyl isopropy ether is allowed to take place violently or turbulently, it is a physical impossibility to produce the form-stable, rubberlike products.

This distinction between the two monomers is emphasized by experiments which I have conducted. By proceeding according to Example I of the aforementioned patent while using the vinyl isopropyl ether and allowing the catalyst and monomer to contact in the manner described therein, I was only able to obtain the low molecular weight products having an intrinsic viscosity of about .5. The product is very similar in appearance to Canada balsam. On the other hand, while operating according to Example I herein, the product which I produce is a form-stable, granular, rubberlike product having an intrinsic viscosity of 20. The intrinsic viscosities were measured by the use of a 0.2 per cent solution of the polymer in benzene.

The patent also requires a very elaborate purification of the vinyl ether prior to its use. I have found, however, that such an elaborate purification is unnecessary when working in the manner described, it being merely sufficient to once fractionally distill the ether over a mixture of powdered potassium hydroxide and sodium metal to insure the removal of the alcohol which is present.

Various modifications of this invention will occur to persons skilled in the art and therefore I do not intend to be limited in the patent granted except as required by the prior art and the appended claims.

I claim:

1. The process of producing form-stable, rubberlike polymers of vinyl isopropyl ether which comprises uniformly admixing the ether and an acid-reacting condensing agent selected from the class consisting of boron trifluoride and its addition product with an ether at a temperature below −110° C., subsequently elevating the temperature of the mixture to a point not higher than −10° C. and maintaining such temperature uniformly throughout the reaction.

2. The process as defined in claim 1 wherein the acid-reacting condensing agent is a boron-trifluoride complex with an ether.

ABRAHAM O. ZOSS.

REFERENCES CITED

The following references are of record in the file of this patent:

UNITED STATES PATENTS

| Number | Name | Date |
|---|---|---|
| 2,061,934 | Mueller-Cunradi et al. | Nov. 24, 1936 |
| 2,098,108 | Reppe et al. | Nov. 2, 1937 |
| 2,104,000 | Reppe et al. | Dec. 28, 1937 |
| 2,108,994 | Reppe et al. | Feb. 22, 1938 |
| 2,379,656 | Ruthruff | July 3, 1945 |
| 2,395,684 | Schildknecht | Feb. 26, 1946 |

FOREIGN PATENTS

| Number | Country | Date |
|---|---|---|
| 501,670 | Great Britain | Mar. 3, 1939 |